March 7, 1950 E. TOTH 2,499,429

RADIO RECEIVER ALIGNMENT SYSTEM

Filed Aug. 2, 1945 2 Sheets-Sheet 1

Inventor

EMERICK TOTH

By Ralph L. Chappell

Attorney

March 7, 1950 E. TOTH 2,499,429

RADIO RECEIVER ALIGNMENT SYSTEM

Filed Aug. 2, 1945 2 Sheets-Sheet 2

Inventor

EMERICK TOTH

By Ralph L. Chappell

Attorney

Patented Mar. 7, 1950

2,499,429

UNITED STATES PATENT OFFICE 2,499,429

RADIO RECEIVER ALIGNMENT SYSTEM

Emerick Toth, Takoma Park, Md.

Application August 2, 1945, Serial No. 608,557

14 Claims. (Cl. 250—20)

Figure 1:
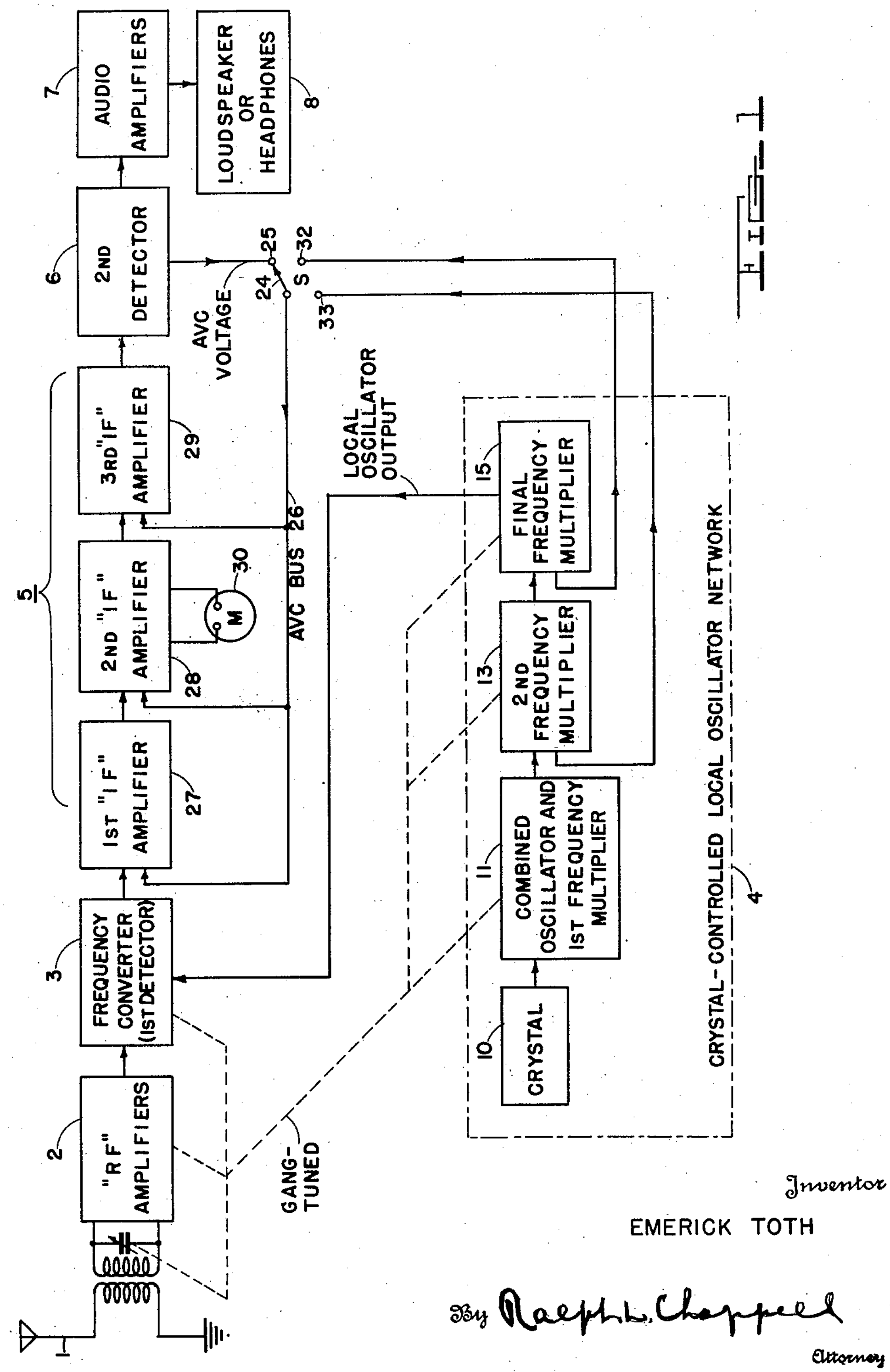

(Granted under the act of March 3, 1883, as amended April 30, 1928; 370 O. G. 757)

This invention relates broadly to fixed-frequency radio receivers, and more particularly to a method and means for pre-tuning (or aligning) a crystal-controlled receiver to its proper operating frequency.

As is well known, radio receivers which are designed for use only on certain definite fixed-frequency channels are usually of the superheterodyne type and often employ crystal-controlled local oscillator networks. Generally, a separate crystal is employed in such a receiver for each operating frequency channel, and, if the frequencies involved are high, provision is often made for progressively mutliplying the fundamental crystal output by use of a plurality of frequency-multiplier stages. The output of the final frequency-multiplier stage is then used as the "local oscillator output" to beat against the incoming signal so as to produce the desired intermediate-frequency (IF) signals. The signal circuits of such receivers also commonly include provision for automatic volume control (AVC), together with some device influenced thereby for indicating the relative strengths of incoming signals, such as an input indicator meter.

In such a receiver, both the signal circuit and the crystal-controlled local oscillator network (including any frequency-multiplier stages) must be aligned with considerable care so that each will be correctly tuned for each of the designed operating frequency channels of the receiver. Usually gang-tuning is employed, the radio-frequency (RF) signal circuit and local oscillator network being preadjusted to "track" together properly as the common tuning control is varied. In commercially-manufactured receivers of this type, alignment of the signal circuit and the proper tracking thereof with the local oscillator network are generally taken care of initially by factory adjustment. It is not practicable, however, to pre-tune the crystal-controlled oscillator or frequency-multiplier stages "once and for all" because of the differences in individual crystal frequencies that are encountered in practice when replacement of crystals is made in the field. Consequently, the operator of such a receiver must have some means readily available to him by means of which he can effect and check the proper tuning of the oscillator and frequency-multiplier stages for each particular crystal that he is using at the time in the receiver. Some previous methods of effecting and checking this adjustment have involved use of such incoming signals as may be received on that particular channel, or even the "noise" normally present in the receiver (if sufficient), in conjunction with the indications of the output meter generally provided in such receivers. Otherwise, recourse to external equipment (which may not be conveniently available) has been a practical necessity for proper adjustment of such crystal-controlled circuits.

It is accordingly an object of this invention to provide a direct and accurate method and means for pre-tuning and checking the alignment of the crystal-controlled oscillator and associated frequency-multiplier stages of a receiver of the foregoing type, for each particular crystal used, without the necessity for recourse to external signals or equipment.

Briefly stated, the invention comprises a method and means for using a portion of the self-biasing voltage developed in any selected stage of a fixed-frequency oscillator network to bias the AVC system of the receiver during the tuning-in process. The resultant indication on the input meter normally included in such a receiver is used to indicate optimum resonance conditions. In the practice of the invention a radio receiver may be employed of any type, whether superheterodyne or not, provided it includes a fixed-frequency oscillator network comprising a tunable self-biasing oscillator stage or a fixed-frequency oscillator stage in combination with one or more tunable self-biasing frequency-multiplier stages; and provided said receiver includes also a signal circuit having incorporated therein a voltage-fed AVC system and an indicator device arranged to be influenced thereby; the invention residing in the method and means designed for utilizing a portion of the self-biasing voltage from said oscillator stage or from any selected stage of said fixed-frequency oscillator network, in combination with said indicator device and sufficient of said AVC system to actuate it, to pre-tune and check the alignment of said fixed-frequency oscillator network for each designed operating frequency channel of the receiver.

Figure 2:
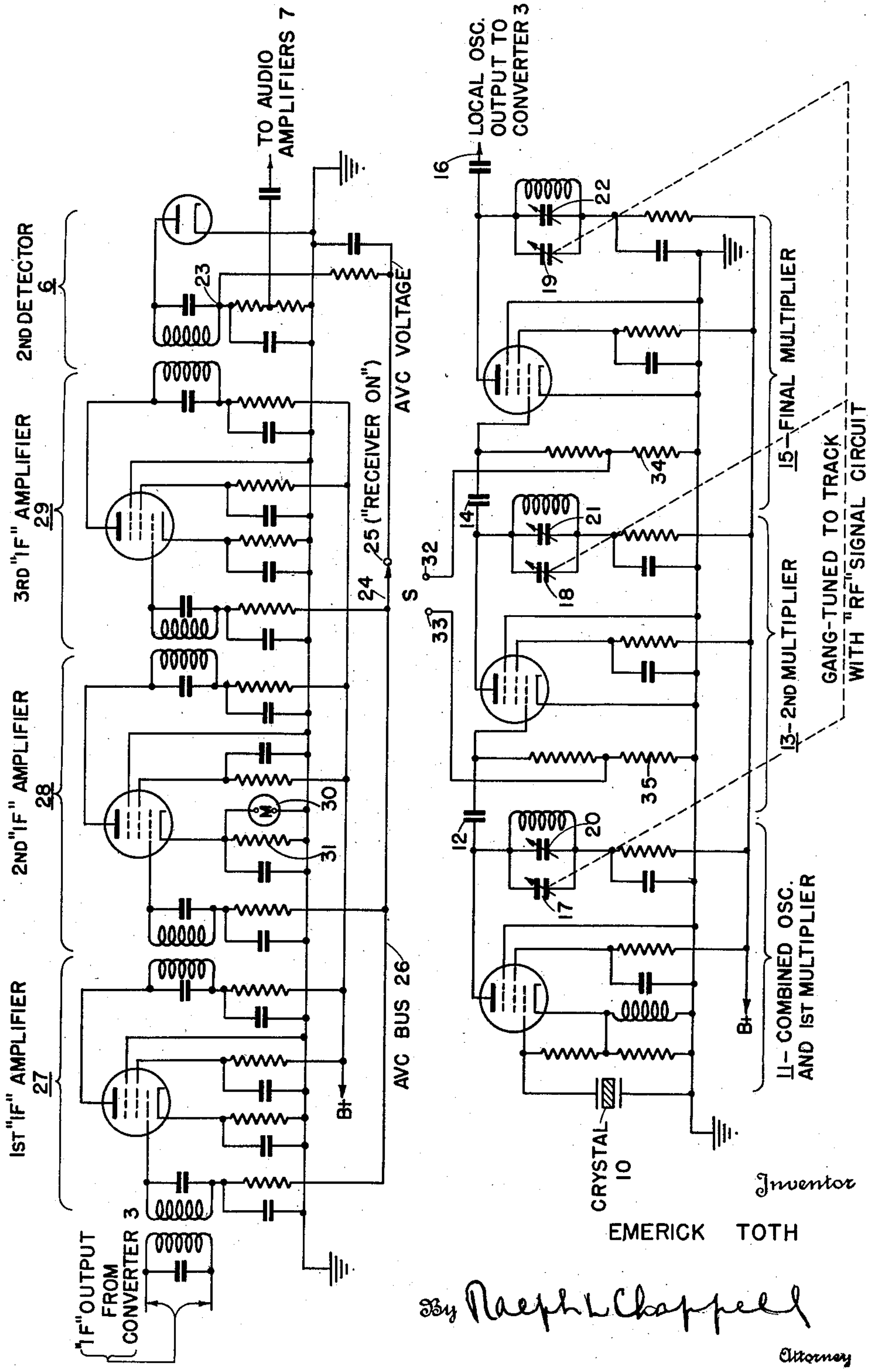

The foregoing, together with other objects, advantages, and features of the invention, will be more fully understood from a reading of the following description of one preferred embodiment thereof when taken in conjunction with the accompanying drawings, in which:

Fig. 1 is a block diagram of the principle circuits of one form of crystal-controlled superheterodyne radio receiver embodying the invention; and, Fig. 2 is a schematic circuit diagram of a crystal-controlled local oscillator network, several intermediate-frequency (IF) amplifier stages, a second detector, and an AVC system, corresponding to one embodiment of the superheterodyne receiver illustrated in Fig. 1, and with like parts bearing the same reference numerals as in Fig. 1.

Referring now to Fig. 1, an antenna lead 1 is shown inductively coupled to the input of a radio receiver which comprises one or more radio-frequency (RF) amplifier stages 2, a frequency-converter (or first detector) 3, a crystal-controlled local oscillator network 4 (which, as hereinafter described, in this particular example is formed of the crystal 10, the combined oscillator and first frequency multiplier 11, and the second and final frequency multipliers 13 and 15 respectively), one or more intermediate-frequency amplifier stages 5 (which in this illustration is made up of the three IF amplifiers 27, 28 and 29, the circuit of the second IF amplifier 28 including an input meter 30, as hereinafter to be described), a second detector 6, one or more audio-frequency amplifiers 7, and a loudspeaker or headphones 8. Suitable connections for an AVC system are illustrated, in combination with a switching arrangement S for meeting several desirable conditions of operation of the receiver, wherein a part of the AVC circuit may be made available in a selective manner in conjunction with certain of the multipliers for use in tuning-up the receiver.

In Fig. 2, the crystal 10 is shown as connected in the control grid circuit of the combined oscillator and first multiplier 11, the output of which is coupled through capacitor 12 to the control grid of the second multiplier 13. The output of multiplier 13 is similarly coupled through capacitor 14 to the control grid of the final multiplier 15, a lead 16 being coupled to the plate tank circuit of multiplier 15 to provide the actual local oscillator output to the converter stage 3 (shown in Fig. 1) for "mixing" with the incoming received signal. The frequency multipliers 11, 13, 15, are tuned by means of the variable capacitors 17, 18, 19, in their respective tank circuits, which are ganged to each other and to the tuning elements in the RF signal circuit. Variable trimmer capacitors 20, 21, 22, may be also provided for individual adjustment of their respective multiplier stages. The AVC voltage is here represented as being obtained by connecting as at 23 into the plate circuit of the second detector 6. With switch S having its switch arm 24 engaging contact 25 (i. e., in the "Receiver on" position), as indicated in the drawings, the AVC voltage is passed along the AVC bus 26 to the control grid circuits of each of the three IF amplifiers 27, 28, 29. The device for indicating the relative intensities of incoming signals is in this instance represented as the input meter 30 which is connected to measure the voltage across the cathode resistance 31 of the second IF amplifier stage 28.

In the arrangement illustrated in Fig. 2, it will be seen that any of several desired alternative connections may be obtained by means of the control switch S whereby the AVC bus 26 going to the IF amplifiers can be disconnected from its normal AVC voltage supply 23 during the tuning-up operation and alternatively connected instead to a voltage source in the control grid circuit of either the second or the final frequency-multiplier stage. Normally it will be sufficient to connect the AVC bus 26 only into the grid circuit of the final multiplier stage 15, but the occasional need for trimmer adjustments, etc., makes it helpful to be able also to connect AVC bus 26 to one of the preceding stages. To this end, in this illustrative example two alternative contact terminals 32 and 33 are provided which may be alternately connected by the switch arm 24 of switch S, thus enabling direct connection of AVC bus 26 across either resistor 34 or resistor 35 in the control grid circuits of the final and second multipliers 15 and 13, respectively.

The invention is based on the fact that currents will flow in the control grid circuits of the frequency-multiplier stages when their respective tank circuits are tuned to resonance with the desired crystal frequency or harmonic multiple thereof, and that the relative magnitudes of such currents, as reflected in the voltage drop across a resistor in one of said circuits, will give an indication of the effectiveness of the tuning. In the circuit here illustrated, if switch S is turned to either terminal 32 or 33, the aforesaid voltage drop across the corresponding grid resistor 34 or 35 respectively will cause a negative voltage to be passed over the AVC bus 26 to the control grid circuits of the IF amplifiers. This will in turn be reflected in a reduced voltage across cathode resistance 31 of the second IF amplifier stage, and consequently a corresponding indication will appear on input meter 30.

Thus, to pre-tune the receiver illustrated to the particular operating frequency corresponding to any given crystal 10 by means of the invention herein described, switch S would be moved to connect its switch arm 24 to either of the contacts 32 or 33. If, for example, the switch arm 24 were connected to the terminal 32, the ganged variable capacitors 17, 18, 19, would be tuned for a maximum indication on meter 30. Since the signal circuit already should have been ganged to track with the same tuning control, the whole receiver should then be properly tuned for that particular frequency channel. To check this, the switch S would be turned to connect terminal contact 33. If the maximum indication on meter 30 were then observed for a different setting of the tuning control, it would indicate either that some adjustment of the trimmer capacitors 20, 21, or 22, was necessary or that the first tune-up was based on a spurious harmonic multiple of the crystal frequency and should be corrected. In case the characteristics of the receiver were such that meter 30 showed an indication representative of a "flat-topped" response in the neighborhood of the resonant frequency, any of the well-known methods for arriving at the proper mid-point setting of the tuning control could, of course, be employed.

While there has been described a preferred embodiment of the invention, it will be obvious to those skilled in the art that various changes and modifications may be made therein without departing from the spirit of the invention, and it is, therefore, to be distinctly understood that no limitations are intended other than are imposed by the scope of the appended claims as limited by the prior art.

The invention described herein may be manufactured and used by or for the Government of the United States of America for governmental purposes without the payment of any royalties thereon or therefor.

What is claimed is:

1. In a radio receiver of the type including a fixed-frequency oscillator network comprising a self-biasing oscillator stage, said receiver including also a signal circuit having incorporated therein a voltage-fed automatic volume control system and an indicator device arranged to be influenced thereby, the method of checking the alignment of said fixed-frequency oscillator network which comprises producing a voltage signal proportional to the alignment of said fixed-frequency oscillator network, substituting for the normal voltage input to the automatic volume control system said voltage signal to produce on the said indicator device an indication of the instantaneous resonant condition of the fixed-frequency oscillator network.

2. In a radio receiver of the type including a fixed-frequency oscillator network comprising a fixed-frequency oscillator stage in combination with at least one tunable self-biasing frequency-multiplier stage, said receiver including also a signal circuit having incorporated therein a voltage-fed automatic volume control system and an indicator device arranged to be influenced thereby, the method of checking the alignment of said fixed-frequency oscillator network which comprises producing a voltage signal from said stage proportional to the alignment of said fixed-frequency oscillator network, substituting for the normal voltage input to the automatic volume control system said voltage signal to produce on the said indicator device an indication of the instantaneous resonant condition of the fixed-frequency oscillator network.

3. In a superheterodyne radio receiver of the type including a fixed-frequency local oscillator network comprising a tunable self-biasing oscillator stage, said receiver including also a tuned signal circuit having incorporated therein a voltage-fed automatic volume control system and an indicator device arranged to be influenced thereby, the method of checking the alignment of said fixed-frequency oscillator network which comprises producing a voltage signal proportional to the alignment of said fixed-frequency oscillator network, substituting for the normal voltage input to the automatic volume control system said voltage signal to produce on the said indicator device an indication of the instantaneous resonant condition of the fixed-frequency oscillator network.

4. In a superheterodyne radio receiver of the type including a fixed-frequency local oscillator network comprising a fixed-frequency oscillator stage in combination with at least one tunable self-biasing frequency-multiplier stage, said receiver including also a tuned signal circuit having incorporated therein a voltage-fed automatic volume control system and an indicator device arranged to be influenced thereby, the method of checking the alignment of said fixed-frequency oscillator network which comprises producing a voltage signal from said stage proportional to the alignment of said fixed-frequency oscillator network, substituting for the normal voltage input to the automatic volume control system said voltage signal to produce on the said indicator device an indication of the instantaneous resonant condition of the fixed-frequency oscillator network.

5. In a superheterodyne radio receiver of the type including a fixed-frequency oscillator network and a normal voltage-fed automatic volume control system having an indicator device, the method of aligning said fixed-frequency oscillator network which comprises producing a signal voltage proportional to the resonant condition of said network, substituting for the normal voltage input to said automatic volume control system said voltage signal to produce on said indicator an indication of the instantaneous resonant condition of said network and adjusting the alignment of said network to obtain an indication on said device of optimum resonance of said network.

6. In a superheterodyne radio receiver of the type including a fixed-frequency oscillator network having a fixed-frequency oscillator stage and a tunable frequency-multiplier stage, and a normal voltage-fed automatic volume control system having an indicator device, the method of aligning said network which comprises producing a voltage signal from said stage proportional to the resonant condition of said network, substituting for the normal voltage input to said automatic volume control system said signal voltage to produce on said indicator device an indication of the instantaneous resonant condition of said network and tuning said stage to obtain an indication on said device of the optimum resonant condition of said network.

7. In a radio receiver, a fixed-frequency oscillator network, a signal circuit having a normal voltage-fed automatic volume control system and indicator device therefore, means producing a voltage signal proportional to the resonant condition of said network and means substituting said voltage signal for said normal voltage input to said automatic volume control system to produce an indication on said indicator device of said resonant condition.

8. In a radio receiver, a fixed-frequency oscillator network including a fixed-frequency oscillator stage and a tunable frequency-multiplier stage, a normal voltage-fed automatic volume control system and an indicator device therefor, means producing a signal voltage proportional to the resonant relationship between said fixed-frequency oscillator stage and said tunable frequency-multiplier stage and means substituting said signal voltage for said normal voltage input to said automatic volume control system to produce an indication on said device of said resonant relationship.

9. In a radio receiver, a fixed-frequency oscillator network including a fixed-frequency oscillator stage and a tunable frequency-multiplier stage, a normal voltage-fed automatic volume control system and an indicator device therefor, means producing a signal voltage proportional to the resonant relationship between said fixed-frequency oscillator stage and said tunable frequency-multiplier stage, means substituting said signal voltage for said normal voltage input to said automatic volume control system to produce an indication on said device of said resonant relationship and means adjusting the frequency of said tunable frequency-multiplier stage to produce an indication on said device of optimum resonant relationship between said fixed-frequency oscillator and said tunable frequency-multiplier stage.

10. In a superheterodyne radio receiver, a fixed-frequency oscillator network having a fixed-frequency oscillator stage and at least one tunable frequency-multiplier stage, a normal voltage-fed automatic volume control system having an indicating device therefor, means producing a signal voltage proportional to the resonant relationship between said fixed-frequency oscillator stage and said tunable frequency-multiplier stage, means substituting said voltage signal for said normal voltage input to said automatic volume control system to produce on said indicator an indication of said resonant relationship.

11. In a radio receiver of the type having a fixed-frequency oscillator network, and a signal circuit having an automatic volume control system and an indicator device therefor, the method of aligning said receiver to a predetermined frequency which comprises producing a signal voltage proportional to resonant condition of said network, applying said signal voltage to said automatic volume control system to produce an indication on said indicator device of said resonant condition and adjusting the alignment of said signal circuit in synchronism with adjusting of the alignment of said network to align said receiver to said predetermined frequency when an optimum resonant condition indication is produced on said device.

12. In a radio receiver having an automatic volume control system and an indicator device therefor, the method of aligning said receiver to a predetermined frequency which comprises producing oscillations at a fixed-frequency, producing variable frequency oscillations, producing a signal voltage proportional to the resonant relationship between said fixed frequency oscillations and said variable frequency oscillations, applying said signal voltage to said automatic volume control system to produce on said device an indication of said resonant relationship, and adjusting the alignment of said receiver in synchronism with variation of said variable frequency oscillations to align said receiver to said predetermined frequency when optimum resonant relationship indication is produced on said device.

13. In a radio receiver, a fixed-frequency oscillator network, a signal circuit having an automatic volume control system and an indicator device therefor, means producing a signal voltage proportional to the resonant condition of said network, means applying said signal voltage to said automatic volume control system to produce an indication on said indicator device of said resonant condition and means adjusting the alignment of said signal circuit in synchronism with adjustment of the alignment of said network to align said signal circuit to a predetermined frequency when optimum resonant indication is produced on said device.

14. In a radio received, a tunable signal circuit, an automatic volume control system including an indicator device therefor, means producing a source of oscillations at a fixed frequency, means producing a source of oscillations of variable frequency, means producing a signal voltage proportional to the resonant relationship between said fixed-frequency oscillations and said variable frequency oscillations, means applying said signal voltage to said automatic volume control system to produce an indication on said indicator device of said resonant relationship, and means adjusting the alignment of said tunable signal circuit in synchronism with variation of said variable frequency oscillations to align said receiver to a predetermined frequency when optimum resonant relationship indication is produced on said device.

EMERICK TOTH.

REFERENCES CITED

The following references are of record in the file of this patent:

UNITED STATES PATENTS

| Number | Name | Date |
|---|---|---|
| 1,885,299 | Schramm | Nov. 1, 1932 |
| 1,950,731 | Kemp et al. | Mar. 13, 1934 |
| 2,122,562 | Ewald | July 5, 1938 |
| 2,122,672 | Roberts | July 5, 1938 |
| 2,245,717 | Roberts | June 17, 1941 |
| 2,263,634 | Landon | Nov. 25, 1941 |
| 2,265,083 | Peterson | Dec. 2, 1941 |
| 2,409,845 | Gardiner | Oct. 22, 1946 |